Oct. 2, 1923.   F. S. THOMPSON   1,469,546
MOWER
Filed March 16, 1922

Inventor
F. S. Thompson.
By
Lacey & Lacey, Attorneys

Patented Oct. 2, 1923.

1,469,546

UNITED STATES PATENT OFFICE.

FRANCIS S. THOMPSON, OF STANLEY, KENTUCKY.

MOWER.

Application filed March 16, 1922. Serial No. 544,213.

*To all whom it may concern:*

Be it known that I, FRANCIS S. THOMPSON, a citizen of the United States, residing at Stanley, in the county of Daviess and State of Kentucky, have invented certain new and useful Improvements in Mowers, of which the following is a specification.

This invention relates to mowing machines and has for its object the provision of simple and inexpensive means whereby the bending of the cutter-driving shaft will be prevented. The invention is illustrated in the accompanying drawings and will hereinafter be fully set forth.

In the drawings—

Figure 1:
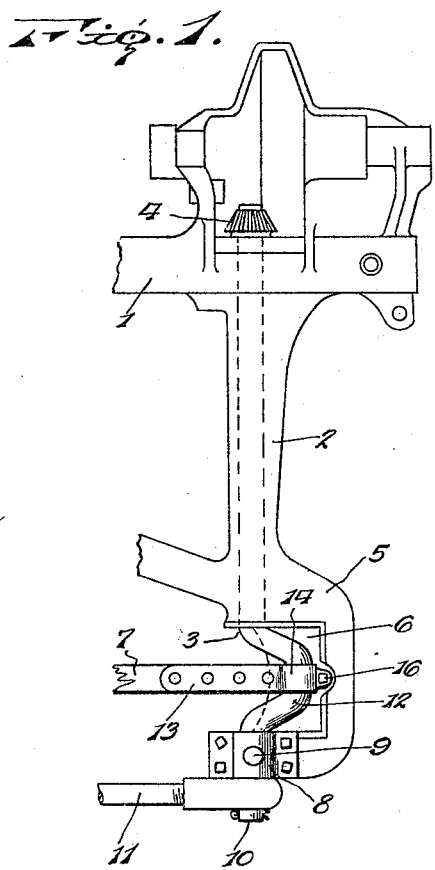
Figure 1 is a plan view of a portion of the frame of a mowing machine having my improvements applied thereto.
Figure 2:
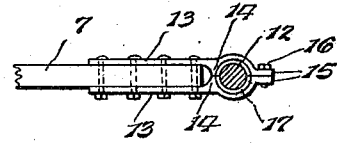
Fig. 2 is a detail view, partly in section, showing the connection between the cutter-driving shaft and the pitman.
Figure 3:
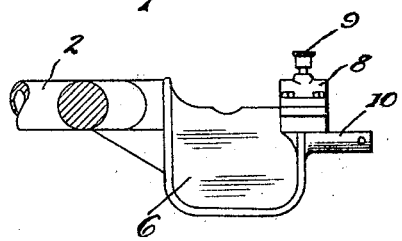
Fig. 3 is a detail view, partly in section and partly in side elevation, of the support for the front end of the cutter-driving shaft.
Figure 4:
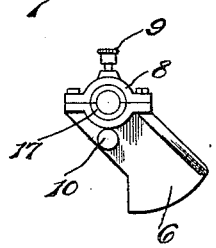
Fig. 4 is a detail end view of the front end of the frame showing the support for the front end of the cutter-driving shaft.

In the drawings, the reference numeral 1 indicates a portion of the frame of a mowing machine which is formed or provided with a sleeve 2 in which the shaft 3 is mounted. This shaft is equipped with a beveled pinion 4 at its rear end through which motion is imparted to the shaft from gearing (not shown) driven by the ground wheel of the mower. At the front end of the frame is an offset 5 having a depending cup-like portion 6 constituting a guard to prevent grass becoming entangled with the shaft at its point of connection with the pitman 7, the said pitman extending to and being connected with the reciprocating knife. In carrying out my invention, the offset portion 5 is provided at its front end with a bearing 8 carrying an oil cup 9 which bearing is in alinement with the bore or bearing portion of the sleeve 2, as will be readily understood. Upon the front side of the cup-like guard 6 is a forwardly projecting pin or stud 10 upon which the end of the drag bar 11 is secured. Ordinarily, the shaft 3 is equipped at its front end with a crank disk having a wrist pin upon which the end of the pitman 7 is fitted and this wrist pin is unsupported except by the crank disk so that, after the machine has been used for a short period, the wrist pin becomes bent or otherwise distorted so that the pitman gets out of alinement with the cutter and tends to bind upon the wrist pin and also upon its pivotal connection with the cutter. To overcome this difficulty, I dispense with the crank disk and wrist pin and form the shaft with a crank portion 12 which plays between the sides of the guard 6 and has its extremity journaled in the bearing 8, thereby providing a support for the shaft at both sides of the connection between the shaft and the pitman so that the binding strain is neutralized and the alinement of the pitman with the cutter maintained. To connect the pitman with the crank portion 12 of the shaft, I employ straps 13 which are secured to the upper and lower sides respectively of the pitman and project beyond the end of the same, the ends of said straps being provided on their opposed faces with semi-circular projections 14 which meet around the shaft and are provided at their extremities with mating lugs or flanges 15 through which a securing bolt 16 is inserted. A split bushing 17 is preferably provided within the projections 14 so as to minimize wear upon the shaft and maintain the proper engagement of the shaft and the straps for a long period. A similar split bushing 17 is also provided within the bearing 8, as shown most clearly in Fig. 4.

It will be readily noted that by the use of my construction the pitman is maintained centrally within the space defined by the cup-like guard 6 and the shaft is supported firmly at both sides of the pitman so that bending of the shaft and consequent binding of the parts is reduced to a minimum. The construction is simple and may be readily embodied in any mower frame at a low cost.

Having thus described the invention, what is claimed as new is:

Means for connecting the crank portion of a shaft to a pitman having a solid end, said means consisting of straps secured to opposite sides of the pitman and extending beyond one end thereof, abutting projections on the opposing faces of said straps adapted to straddle said crank portion, said straps having concave bearing recesses for said crank portion, a split bushing in said recesses, ears on said straps at the extreme ends thereof, beyond said abutting projections and a bolt engaging in said ears, adapted to tighten the straps over the bearings around said crank portion.

In testimony whereof I affix my signature.

FRANCIS S. THOMPSON. [L. S.]